Feb. 2, 1971        R. LAMBERT        3,559,379
AIR WASHER VIA ARTIFICIALLY PRODUCED ATMOSPHERE
AND RAIN CONDITIONS
Filed Nov. 29, 1967
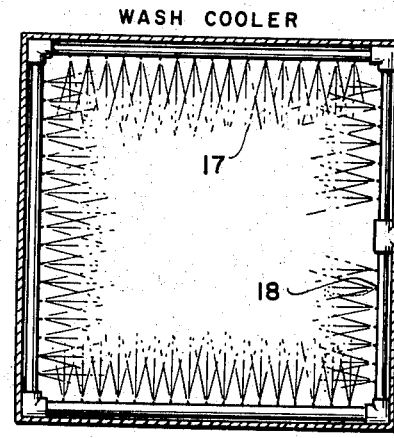
FIG. 2
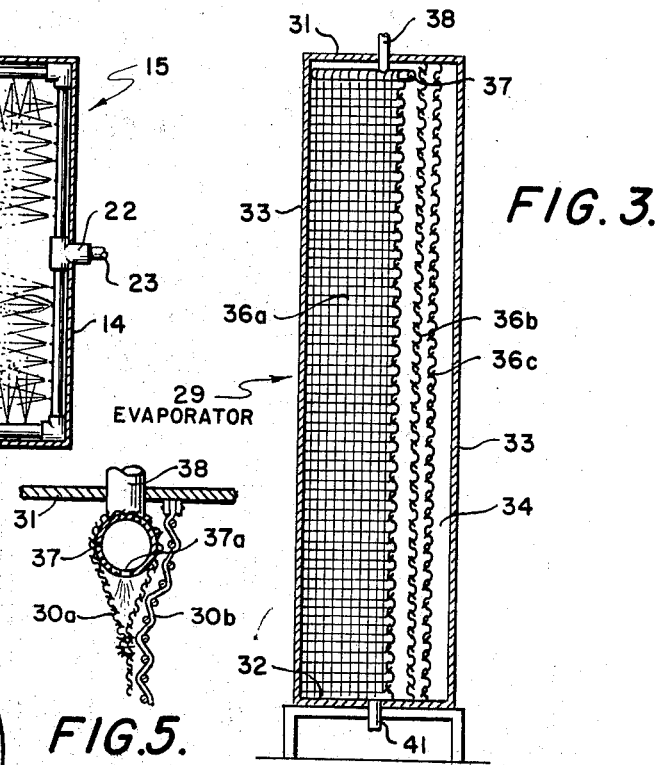
FIG. 3.
FIG. 5.
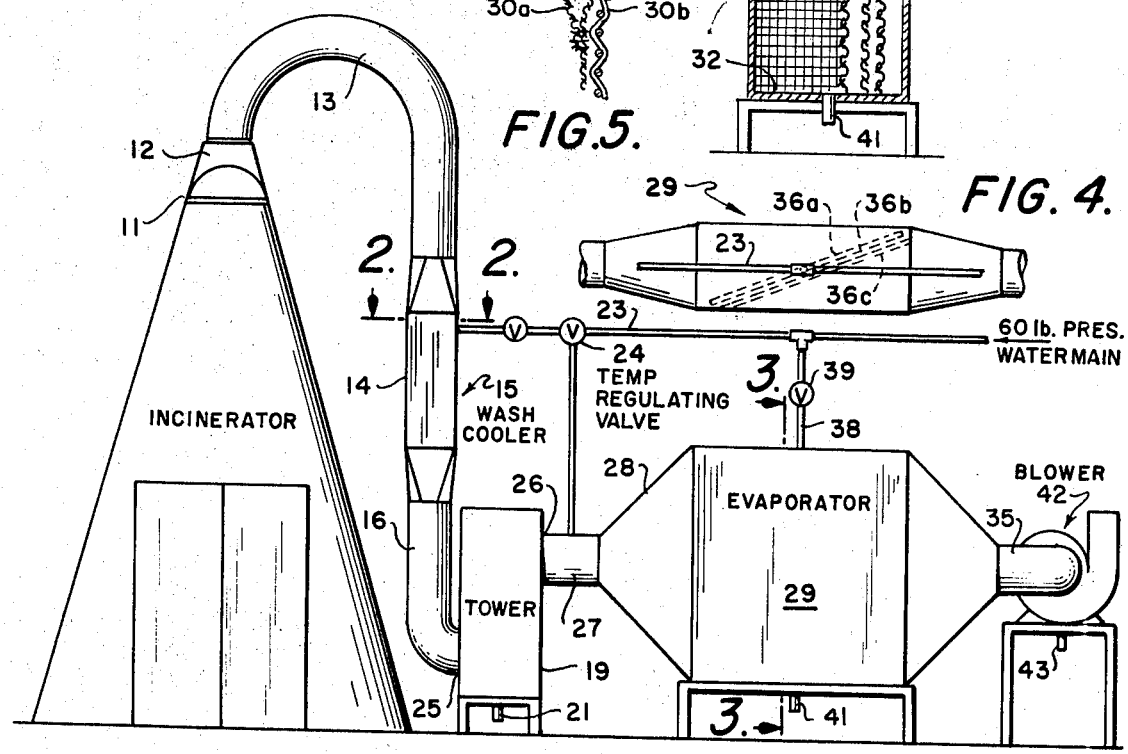
FIG. 4.
FIG. 1.
INVENTOR
ROBERT LAMBERT
BY F. A. Lukasik
D. E. Hodges
ATTORNEYS United States Patent Office 3,559,379
Patented Feb. 2, 1971

3,559,379
AIR WASHER VIA ARTIFICIALLY PRODUCED
ATMOSPHERE AND RAIN CONDITIONS
Robert Lambert, Rte. 4, Box 321,
Annapolis, Md. 21401
Filed Nov. 29, 1967, Ser. No. 686,519
Int. Cl. B01d 47/06, 47/12; B01f 3/09
U.S. Cl. 55—223                3 Claims

ABSTRACT OF THE DISCLOSURE

A self cleaning air cleaner and cooler consisting of a sheet metal enclosure with a series of moistened burlap covered screens to produce an artificial atmosphere whereby air drawn through the artificial atmosphere is cooled and scrubbed. A first gas feed duct contains a stream of solids laden gas. Spray nozzles discharge liquid within the first gas feed duct for quenching and cooling the solids-laden gas and thereby entrapping solids in the liquid. A tower communicates with the first gas feed duct for collecting and disposing of solids entrapped in the liquid. A second gas feed duct communicates with the tower and has sensing and control valve communicating with the spray nozzles for regulating the temperature of the solids-laden gas. An evaporator has a chamber communicating with the second gas feed duct and having a plurality of filter members and a liquid source for supporting and wetting a first filter member. The filter members are positioned in upright position across the chamber and creates an artificial atmosphere for washing and scrubbing the solids-laden gas. A blower communicates with the chamber for force-fully drawing solids-laden gas through the apparatus and discharging the resulting quenched and scrubbed gas into the atmosphere. The chamber further comprises an enclosure having an inlet end communicating with the second gas feed duct and an outlet end communicating with the blower. The enclosure has top, bottom, and side walls. The liquid source further comprises a plurality of liquid spray nozzles for supplying a liquid in a volume exceeding the amount which will be evaporated. The liquid source is suspended diagonally across the top wall of the enclosure. A plurality of filter members each comprising a material capable of being saturated by a liquid and a sheet of open mesh material forming a rigid backing contiguous thereto. The liquid source supports the first filter member of the plurality of filter members and provides a liquid to saturate the first filter member. Second and third filter members of the plurality of filter members are disposed in an upright diagonal position within the enclosure position within the enclosure and is supported by the top wall. The second and third filter members are fastened firmly to the bottom and side walls of the enclosure. The filter members are arranged within the enclosure to include air passages between the filter members whereby the solids-laden air drawn through the filter members is quenched and scrubbed by an artificial atmosphere in the chamber.

BACKGROUND OF THE INVENTION

The present invention relates to a system for removing entrained solids, mist and vapors from gas streams and more particularly to apparatus for washing and scrubbing a gas stream using a liquid washing agent.

Numerous industrial installations exist in which a gas stream is scrubbed with a liquid agent in order to remove entrained solids. One particular type employs an open tower in which a spray of scrubbing liquid is dispersed and passed in contact with the rising gas stream. A major defect of the open tower is that it is difficult to maintain a substantially continuous curtain instead of in streams between which some of the gas could escape without being washed.

In most cases a countercurrent scrubbing action is employed, this action necessitates passing the solids laden gas stream horizontally into the lower portion of the scrubbing apparatus. Typical of these is the packed tower unit, in which a cylindrical tower is filled with a packing, and the input gas stream is passed into the base of the tower while the scrubbing liquid is dispersed into the top of the tower and flows downwards, countercurrent to the rising gas stream. Instead of packing, various types of traps may be used, particularly when the entrained solid material has clogging tendencies. Other types of apparatus employ open towers in which a spray of scrubbing liquid is dispersed, and passed in contact with the rising gas stream. Each of the above mentioned apparatus require that the input gas stream be admitted at the base of the apparatus, but above the bottom section where the downflowing scrubbing liquid collects. Thus, deposition of solid matter on the walls of the gas input duct may readily occur at the so-called "wet-dry-line," where the gas stream contacts liquid inside the duct. The effects of wet-dry-line formation are highly objectionable and interferes with normal operation of the facility. In all such situations, a buildup of partially wetted solid material occurs at the wet-dry line. This buildup may, in extreme cases, result in a complete blockage or clogging of the inlet duct. Furthermore, the various devices suggested in the prior art for direct installation in or adjacent to existing stacks, are relatively ineffective in terms of securing satisfactory or total removal of entrained solids particles from stack gases.

Many industrial or commercial facilities discharge hot gas streams laden with entrained solids, mists and vapors to the atmosphere. Among these may be mentioned iron cupola furnaces, incinerators, steam electric power plants, etc. The entrained solids in the hot discharge gas stream may consist of soot, fly ash, iron oxide particles or various types of dust.

In many instances the hot gas stream is directly discharged to the atmosphere through a stack which disperses the entrained solids into the atmosphere. In recent years, however, more stringent air pollution regulations have been enacted in many communities, which have required the provision of adequate facilities to prevent air pollution.

SUMMARY

The general purpose of this invention is to provide an improved apparatus for quenching and scrubbing a hot gas emitted by a stack. The invention can also be used for scrubbing air drawn from a confined space, such as a submarine under construction, in order to remove entrained particles before discharge into the atmosphere.

In the present invention, the incoming gas stream is preliminary directed through a substantially vertical conduit section before passing to the inlet of the scrubbing facility. In the conduit section, means are provided to remove large burning particles and to lower the temperature to a suitable temperature for washing and scrubbing in the evaporator section.

It is an object of the invention to provide an improved apparatus for the quenching and scrubbing of a contaminated gas stream.

Another object of the invention is to provide an apparatus for quenching and scrubbing a stack gas which is mounted directly on the stack outlet.

A further object is to remove entrained solids or other contaminants from a stack gas in an improved manner.

A still further object of the invention is to provide an apparatus to effect quenching and scrubbing by intimate contact of air and liquid.

Another object is to provide an apparatus of this character which forces air to pass through a series of screens which are subjected to the action of flowing liquids thereby removing by scrubbing, contaminants from impure air.

Other objects and features of the invention will become apparent to those skilled in the art as the disclosure is made in the following description of the preferred embodiment of the invention as illustrated in the accompanying sheet of drawings, in which:

BRIEF DESCRIPTION OF THE DRAWINGS

FIG. 1 is an overall layout of the preferred embodiment of the apparatus of the invention;

FIG. 2 is a sectional view taken on the line 2—2 of FIG. 1;

FIGS. 3 and 5 are sectional views taken on the line 3—3 of FIG. 1; and

FIG. 4 is a plan view of one section of the preferred embodiment.

DESCRIPTION OF THE PREFERRED EMBODIMENT

FIG. 1, which illustrates a preferred embodiment of the invention, shows the invention as it is used for quenching and scrubbing the stack gas of an incinerator. Located directly above the top of the stack 11 is an upwardly tapered adapter 12 which is connected to a conduit 13. The input solids-laden gas stream is received via conduit 13, and is passed into a first enclosure 14, containing wash cooler 15. It should be understood that in this preferred embodiment, conduit 13 is curved and the wash cooler 15 is shown in a substantially vertical position, however, the angle at which wash cooler 15 is located in relation to the input or output streams is not critical. Enclosure 14 is connected at its upper end to conduit 13 and at its lower end to conduit 16. Enclosure 14, as shown in FIG. 2, is substantially rectangular in shape and forms an enclosure for wash cooler 15. Liquid spray 17 is admitted into enclosure 14 by means of nozzles 18 and forms a sheet-like spray of water in the path of the stream of stack gas. The net result of this is that liquid spray 17 completely wets the stream of impure air or gas from the incinerator and under the influence of gravity, the liquid stream next flows downward into conduit 16, into the base of a tower 19 and out through a suitable drain 21 located in the base of tower 19.

A bull T 22 is connected by a pipe 23 to a suitable source of water under pressure. A thermostatically controlled temperature regulating valve 24 is provided in the pipe 23 to control the volume of water flow from the source of water in such a manner as to enable the lowering of the temperature of the air stream to approximately 100° F. by spraying of the source water into wash cooler 15.

Tower 19 performs the function of a waste and water trap to prevent liquid entrapped particles from entering a further stage in the quenching and scrubbing process of the invention. Essentially, tower 19 is a metal enclosure having an inlet 25 located on the side receiving contaminated air, and slightly above the top surface of the liquid which has been collected due to gravity flow from wash cooler 15. Outlet 26 is located on the side of tower 19 opposite to inlet 25 and substantially higher than inlet 25 in order to present an upward path for the air stream, thus entrapping contaminants which may have filtered through liquid spray 17. The turbulence created in tower 19 by the change of direction of air flow functions to further scrub the contaminated air and extract therefrom, intermediate size particles not previously removed by wash cooler 15.

A conduit 27 connects outlet 26 to inlet 28 of an evaporator 29. The temperature sensing means of temperature regulating valve 24 is located in the interior of conduit 27 for sensing the temperature of the air stream prior to its entry into evaporator 29.

Evaporator 29 is an enclosure formed by roof and floor walls 31 and 32 and side walls 33, which serve to define a chamber 34 for flow of air or other gas. One end of chamber 34 is in communication with conduit 27, through which the contaminated air can be introduced. The other end of chamber 34 communicates with an exhaust duct or conduit 35. Within chamber 34, filter members 36 are arranged diagonally to provide a large area for contact with the air or other gasses.

In the specific form shown in FIGS. 3 and 5, filter members 36 comprise a plurality of parallel spaced porous curtain or fabric curtains 30a and screens 30b which may be made of metal or any other suitable material. Screens 30b are provided to laterally support or back-up the curtains 30a. Preferably, the filter members 36 are formed as readily removable curtains hung from above in any well known manner. In the preferred embodiment, burlap or other reasonably rugged, inexpensive absorbent material in woven form is used.

In FIG. 5, an arrangement for securing filter member 36a is shown. Filter member 36a is suspended from a pipe 37 by any suitable means such as by forming a loop around pipe 37 and sewing the end to form a closed loop. Nozzles 37a are formed in pipe 37 along the bottom edge in a manner similar to the nozzles 18 of wash cooler 15. Pipe 37 is connected to the water supply through a pipe 38. A valve in pipe 38 controls the water supply to pipe 37 to provide sufficient water flow to moisten fabric curtain 30a through its entire length. The filter member 36a and pipe 37 are mounted sufficiently close to top wall 31 to provide, with the liquid, a seal against passage of air over the top of the curtain 30a. Similarly, the filter member 36 is secured to the side and bottom walls 32, 33 to provide a seal against flow of air on the side and bottom of the filter member 36a.

Liquid continuously flows by gravity to keep the fabric curtain 30a saturated. The liquid flowing down through and over the fabric curtain 30a forms moisture membranes in the interstices of the fabric which membranes are punctured by air passage therethrough. When the air punctures the membranes, the moisture forming the membranes has the natural function of forming globules of moisture and in so doing, envelop any foreign particle which may have been in the air. Furthermore, positioning the filter member 36 diagonally across chamber 34, causes the warm, moist inlet air to impinge on a greater surface which has been cooled by the flow of liquid and the cooling caused by evaporation of liquid. The warm moist air is condensed on fabric curtain 30a and forms beads similar to rain drops which flow down the filter member 36a, thus washing the contaminated air and filter member 36a simultaneously. Drain 41 is provided in lower wall 32 to drain off the liquid containing entrapped contaminants.

Filter members 36b and 36c provide further moisture and contaminant eliminators by absorbing and then evaporating excess moisture which has been drawn through filter member 36a. Filter members 36b and 36c may be conveniently fastened by any suitable means from top wall 31, side and bottom walls 32, and 33 sufficiently close to provide a seal against passage of air over, around or under filter members 36b and 36c. Filter members 36a, 36b and 36c are spaced sufficiently apart to avoid intimate contact with each other which could possibly result from bulging caused by air pressure.

A blower 42 is mounted in fluid communication with conduit 35 for drawing air through the entire system and for discharging the clean air into the atmosphere. A suitable drain 43 is located in the outlet of blower 42 to remove any remaining liquid which may have collected. The blower 42, driven by a motor (not shown) of any suitable size, continuously draws a strong stream of air out of the source of contaminated air, through the conduit 13, the wash cooler 15, the tower 19 and evaporator 29 and discharges the quenched and scrubbed air stream into the atmosphere.

DESCRIPTION OF THE OPERATION

Water is provided for wetting filter member 36a by opening valve 39, thereby providing water to the nozzles 37a and thus saturating filter member 36a. The blower 42 is started, thus drawing contaminated air upwardly from the source of contaminated air, then the air is passed through wash cooler 15, thereby reducing the temperature of the contaminated air stream to approximately 95° to 100° Farenheit. The temperature of the airstream is detected by the thermostatic sensing means of valve 24 and the flow of cooling water in wash cooler 15 is controlled accordingly. The contaminated warm moist air is drawn into evaporator 29 and through filter member 36a. The warm moist air is cooled as it contacts filter member 36a and the moisture in the air is condensed thus forming beads similar to rain drops, which flow down filter member 36a, thus washing the contaminated air and filter member 36a simultaneously.

Filter members 36b and 36c form additional barriers to the flow of air thus further extracting moisture and contaminants and further cooling the air stream by evaporation of liquids. After having passed through filter member 36c, the air is essentially contaminant and moisture free.

Thus an apparatus for quenching and scrubbing a contaminated gas stream has been described. The quenching and scrubbing is accomplished by forcing contaminated air to pass through a series of filters which are subjected to the action of flowing liquids, thereby simultaneously scrubbing contaminants out of the air and cleaning the screens.

It should be understood, of course, that the foregoing disclosure relates to only a preferred embodiment of the invention and that numerous modifications or alterations may be made therein without departing from the spirit and the scope of the invention as set forth in the appended claims.

What is claimed is:

1. Apparatus for quenching and scrubbing a hot contaminate gas stream comprising:
 a downwardly-extending first gas feed duct, said duct containing a stream of solids-laden gas;
 first means for discharging liquid disposed about the inside perimeter of said first gas feed duct to form a liquid spray curtain for quenching and cooling said solids-laden gas and thereby entrapping solids in said liquid;
 an upright tower communicating with said gas feed duct for collecting and disposing of solids entrapped in said liquid spray;
 a horizontally disposed second gas feed duct communicating with said tower and having temperature sensing and control valve means communicating with said liquid discharge means for regulating the flow of fluid to said first liquid discharge means;
 an upright chamber having side, top, bottom and end walls forming a rectangular chamber and having an air inlet in a first end wall communicating with said second gas feed duct and an air outlet in a second end wall for discharging said stream of gas;
 a second means for discharging liquid within said rectangular chamber, suspended horizontally from said top wall, diagonally across said rectangular chamber said second liquid means supplying a liquid in a volume exceeding the amount which will be evaporated during passage of said gas stream through said chamber;
 a first filter member suspended from said second liquid discharge means within said chamber and connected to the side and bottom walls of said chamber, said first filter member comprising a first sheet of material capable of being saturated by a liquid and forming a first gas stream scrubber, and a second sheet of material having an open-mesh framework contiguous to said first sheet, thereby providing support for said first sheet against the force of said stream of gas;
 a plurality of second filter members each comprising a first and a second sheet of said materials suspended from said top wall and connected to the side and bottom walls of said chamber, said second filter members positioned parallel to said first filter member and spaced apart from each other thus forming additional means for cooling and scrubbing said gas stream; and
 blower means communicating with said chamber for forcefully drawing solids-laden gas through said apparatus and discharging quenched and scrubber gas into the atmosphere.

2. Apparatus for quenching and scrubbing a hot contaminated gas stream by means of an artificially formed atmosphere comprising:
 an enclosure having a horizontally disposed chamber and having an inlet end, an outlet end, top, bottom and side walls;
 a liquid source suspended horizontally from said top wall, diagonally across said chamber for supplying a liquid in a volume exceeding the amount which will be evaporated during passage of said gas stream through said chamber; and
 a plurality of filter members suspended within said chamber including a first filter member suspended from said liquid source and connected to the side and bottom walls of said chamber, said first filter member comprising a first sheet of material capable of being saturated by a liquid and forming a first gas stream scrubber, and a second sheet of material having an open-mesh framework contiguous to said first sheet, thereby providing support for said first sheet against the force of said gas stream and including a plurality of second filter members each comprising a first and a second sheet of said materials, suspended from said top wall and connected to the side and bottom walls of said chamber, said second filter members positioned parallel to said first filter member and spaced apart from each other thus forming additional means for cooling and scrubbing said gas stream.

3. Apparatus for quenching and scrubbing a hot contaminated gas stream comprising:
 a first gas feed duct containing a stream of solids-laden gas;
 means for discharging liquid within said first gas feed duct for quenching and cooling said solids-laden gas and thereby entrapping solids in said liquid;
 tower means communicating with said first gas feed duct for collecting and disposing of solids entrapped in said liquid;
 a second gas feed duct communicating with said tower means and having temperature sensing and control means communicating with said means for discharging liquid for regulating the temperature of said solids-laden gas;
 evaporator means having a chamber communicating with said second gas feed duct and having a plurality of filter members and a liquid source for supporting and wetting a first filter member, said filter members being positioned in upright position across said chamber and creating an artificial atmosphere for washing and scrubbing said solids-laden gas;
 blower means communicating with said chamber for forcefully drawing solids-laden gas through said apparatus and discharging the resulting quenched and scrubbed gas into the atmosphere;

said chamber further comprising an enclosure having an inlet end communicating with said second gas feed duct and an outlet end communicating with said blower means, said enclosure having top, bottom, and side walls;

said liquid source further comprising a plurality of liquid spray nozzles for supplying a liquid in a volume exceeding the amount which will be evaporated, said liquid source being suspended from said top wall of said enclosure and diagonally across said top wall;

a plurality of filter members, each filter member comprising a material capable of being saturated by a liquid and a sheet of open mesh pervious material forming a rigid backing contiguous thereto, said liquid source including means to support a first filter member of said plurality of filter members and providing a liquid to saturate said first filter member; and second and third filter members of said plurality of filter members disposed in an upright diagonal position within said enclosure and supported by said top wall and being fastened firmly to said bottom and side walls of said enclosure, said filter members being arranged within said enclosure to include air passages between said filter members whereby solids laden air drawn through said filter members is quenched and scrubbed by means of an artificial atmosphere in said chamber.

References Cited

UNITED STATES PATENTS

| | | | |
|---|---|---|---|
| 1,815,864 | 7/1931 | Patrick | 261—106 |
| 1,866,193 | 7/1932 | Coutant | 261—39X |
| 2,322,110 | 6/1943 | Bock | 55—233X |
| 2,646,263 | 7/1953 | Goldberg | 55—233UX |
| 2,812,929 | 11/1957 | Rushford | 261—17 |
| 3,167,413 | 1/1965 | Kiekens et al. | 55—225 |

RONALD R. WEAVER, Primary Examiner

U.S. Cl. X.R.

55—233, 259; 261—39, 106, 118